United States Patent
Vlietinck et al.

(10) Patent No.: US 9,792,910 B2
(45) Date of Patent: Oct. 17, 2017

(54) METHOD AND APPARATUS FOR IMPROVING SPEECH RECOGNITION PROCESSING PERFORMANCE

(71) Applicant: Nuance Communications, Inc., Burlington, MA (US)

(72) Inventors: Jan Vlietinck, Merelbeke (BE); Stephan Kanthak, Aachen (DE)

(73) Assignee: Nuance Communications, Inc., Burlington, MA (US)

( * ) Notice: Subject to any disclaimer, the term of this patent is extended or adjusted under 35 U.S.C. 154(b) by 169 days.

(21) Appl. No.: 14/699,921

(22) Filed: Apr. 29, 2015

(65) Prior Publication Data
US 2016/0322059 A1    Nov. 3, 2016

(51) Int. Cl.
G10L 15/00   (2013.01)
G10L 15/28   (2013.01)
G10L 15/14   (2006.01)
G10L 15/02   (2006.01)
G10L 15/08   (2006.01)

(52) U.S. Cl.
CPC ............ *G10L 15/28* (2013.01); *G10L 15/144* (2013.01); *G10L 15/02* (2013.01); *G10L 2015/025* (2013.01); *G10L 2015/085* (2013.01)

(58) Field of Classification Search
None
See application file for complete search history.

(56) References Cited

U.S. PATENT DOCUMENTS

| | | | |
|---|---|---|---|
| 7,930,181 B1* | 4/2011 | Goffin | G10L 15/02 704/231 |
| 9,401,140 B1* | 7/2016 | Weber | G10L 15/00 |
| 2002/0007269 A1* | 1/2002 | Gao | G10L 19/10 704/212 |
| 2003/0061044 A1* | 3/2003 | Miyazawa | G10L 15/142 704/256.5 |
| 2012/0330664 A1* | 12/2012 | Lei | G10L 15/14 704/256.1 |
| 2013/0185070 A1* | 7/2013 | Huo | G10L 15/063 704/243 |
| 2015/0039854 A1 | 2/2015 | Wick | |

OTHER PUBLICATIONS

D. Povey, D. Kanevsky, B. Kingsbury, B. Ramabhadran, G. Saon, and K. Visweswariah, "Boosted MMI for model and feature-space discriminative training," in Proc. ICASSP, 2008, pp. 4057-4060.*

(Continued)

*Primary Examiner* — Richard Zhu
(74) *Attorney, Agent, or Firm* — Hamilton, Brook, Smith & Reynolds, P.C.

(57) ABSTRACT

Computing the feature Maximum Mutual Information (fMMI) method requires multiplication of vectors with a huge matrix. The huge matrix is subdivided into block sub-matrices. The sub-matrices are quantized into different values and compressed by replacing the quantized element values with 1 or 2 bit indices. Fast multiplication with those compressed matrices with far fewer multiply/accumulate operations compared to standard matrix computation is enabled and additionally obviates a de-compression method for decompressing the sub-matrices before use.

20 Claims, 7 Drawing Sheets

(56) References Cited

OTHER PUBLICATIONS

Povey, D., et al., "FMPE: Discriminatively Trained Features for Speech Recognition," *IEEE*, pp. I-961-I-964 (2005).
Liberty, E., et al., "The Mailman Algorithm for Matrix Vector Multiplication," *Yale University Technical Report #1402*, 9 pages (2008).
Williams, R., "Matrix-Vector Multiplication in Sub-Quadratic Time (Some Processing Required)," Carnegie Mellon University, *17th ACM-SIAM Symposium on Discrete Algorithms*, 13 pages (Jan. 2007).
Williams, R., "Matrix-Vector Multiplication in Sub-Quadratic Time (Some Processing Required)," Carnegie Mellon University, *17th ACM-SIAM Symposium on Discrete Algorithms*, Slides, 55 pages (Jan. 2007).

\* cited by examiner

METHOD AND APPARATUS FOR IMPROVING SPEECH RECOGNITION PROCESSING PERFORMANCE

BACKGROUND

A speech recognition system analyzes a user's speech to determine what the user said. Most speech recognition systems are frame-based. In a frame-based system, input speech is processed into a sequence of digital speech feature frames. Each speech feature frame can be thought of as a multi-dimensional vector that represents various characteristics of the speech signal present during a short time window of the input speech.

The speech recognition system compares the input speech frames to find statistical models that best match the speech feature characteristics and then determines a corresponding representative text or semantic meaning associated with the statistical models. Modern statistical models are state sequence models, such as Hidden Markov Models (HMMs), that model speech sounds (usually phonemes) using mixtures of Gaussian distributions.

Many speech recognition systems use discriminative training techniques that are speech recognition techniques that dispense with a purely statistical approach to HMM parameter estimation and instead optimize some classification-related measure of training data. Examples of such discriminative training techniques are maximum mutual information (MMI), minimum classification error (MCE), and minimum phoneme error (MPE) techniques. Such speech recognition techniques require the processing of numerous feature vectors of speech objects.

SUMMARY

According to one example embodiment, a method for improving computation time of speech recognition processing in an electronic device may comprise, by a processor, obtaining a table value. The table value may be from a plurality of table values each corresponding to a unique summation of vector element values of a first vector. The table value may be obtained via an index corresponding to an encoded form of a combination of quantized element values of a second vector. The method may further comprise, by the processor, computing a dot product value of the first and second vectors using the table value obtained, the vector element values, and the quantized element values, the processor using fewer mathematical operations to compute the dot product value relative to a standard dot product computation of the first and second vectors, the speech recognition processing performing multiple dot product computations.

The first vector may be a feature vector, and the vector element values may correspond to speech segments extracted from an audio stream for the speech recognition processing. The audio stream may be received via an audio interface of the electronic device.

The speech recognition processing may employ a feature Maximum Mutual Information (fMMI) method, and the quantized element values of the second vector may correspond to quantized coefficients of a matrix computed by the fMMI method.

The method may further comprise pre-computing the table.

The speech recognition processing may use the pre-computed table multiple times for a subset of the multiple dot product computations performed.

The quantized element values of the second vector may correspond to consecutive matrix elements of a given row of a plurality of rows of a given block matrix of an fMMI matrix, and the method may further comprise reusing the pre-computed table multiple times, once for each row of the given block matrix.

The table value may be a first table value, the table value obtained may be a first table value obtained, the index may be a first index. Computing the dot product value of the first and second vectors may include obtaining a second table value from the plurality of table values via a second index. The second table value may correspond to a sum value of each vector element value of the vector element values. The second index may be a pre-determined index. The method may further comprise computing a first variable value by multiplying a first quantized element value of the quantized element values with the second table value obtained. The method may further comprise computing a second variable value by subtracting the first quantized element value from a second quantized element value of the quantized element values.

The encoded form may be a binary encoding of the quantized element values of the second vector. Each 1-bit value in the binary encoding may correspond to a respective quantized element value of the quantized element values. The computing may further include computing the dot product value by adding the first variable value to a product of the second variable value and the first table value obtained.

The encoded form may be a binary encoding of the quantized element values of the second vector, each 2-bit value in the binary encoding corresponding to a respective quantized element value of the quantized element values. The first index may correspond to lower order bits from the binary encoding. The computing may further include computing a third variable value by subtracting the first quantized element value from a third quantized element value of the quantized element values. The method may further include computing a fourth variable value by adding the first quantized element value to a fourth quantized element value of the quantized element values, subtracting the second quantized element value from the fourth quantized element value, and subtracting the third quantized element value from the fourth quantized element value. The computing may further include obtaining a third table value via a third index, and obtaining a fourth table value via a fourth index. The computing may further include computing the dot product value by summing the first variable value, a first product value computed by multiplying the second variable value and the first table value obtained, a second product value computed by multiplying the third variable value and the third table value obtained, and a third product value computed by multiplying the fourth variable value and the fourth table value obtained.

The third index may correspond to higher order bits from the binary encoding, and the fourth index may correspond to a result of a bitwise and operation between the higher order bits and the lower order bits.

The method may further include omitting the computing of the fourth variable, omitting the obtaining of the fourth table value and omitting the summing and the computing of the third product value, in an event a total number of quantized element values is three instead of four.

Another example embodiment disclosed herein includes an apparatus corresponding to operations consistent with the method embodiments described above.

Further, yet another example embodiment includes a non-transitory computer-readable medium having stored thereon a sequence of instructions which, when loaded and executed by a processor, causes the processor to complete methods disclosed herein.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

Discriminative training on feature transformation has shown to be effective on improving speech recognition accuracy. Feature space discriminative training often involves optimization of a feature transform using some discriminative criteria, such as maximum mutual information (MMI). Well known methods include feature space MMI (fMMI). Feature space discriminative training methods, such as fMMI, perform a linear transformation on feature vectors (e.g., a fingerprint of each incoming frame of audio).

Speech recognition on embedded platforms, such as on a mobile platform, using feature vector techniques, such as fMMI, has many challenges. One such challenge is a processing load that is placed on a processor due to multiplication of vectors with a huge fMMI transformation matrix (also referred to interchangeably herein as an fMMI matrix) that includes training coefficients. Multiplication of the vectors with the huge fMMI matrix may be performed too slowly for real-time speech recognition processing on embedded platforms. In addition, the fMMI matrix may be too large for storing on an embedded platform due to the limited amount of storage capacity available on the embedded platform.

Embodiments disclosed herein may subdivide the fMMI matrix into block submatrices. The submatrices may be quantized into different values based on a granularity of the quantization. For example, quantization may replace 32-bit floating point values with a limited number of different values, such as 2, 4, or any other suitable number of different values. The submatrices can then be compressed by replacing the limited number of values with 1 or 2 bit indices. The matrix can be decompressed by using the indices in a lookup table with, for example, the 2 or 4 different values. Fast multiplication with such quantized matrices is challenging, as values need to be decompressed before use. According to embodiments disclosed herein, the submatrices of the matrix may be quantized using different quantization granularities. Further, embodiments disclosed herein may obviate a decompression stage that uses the indices to obtain the quantized element values.

Embodiments disclosed herein perform such multiplication without the need for decompressing and with far less multiply/accumulate operations compared to standard matrix computation. According to embodiments disclosed herein, a Look-Up Table (LUT) may be pre-computed for each consecutive L elements of a feature vector of length N, the LUT may be configured to store $2^L$ unique summations of the feature vector elements. According to embodiments disclosed herein, the LUT may be reused many times, once for each row of the matrix being multiplied with the L elements of the feature vector. With this table it is possible to decompress and compute the dot product of N matrix elements with N input vector elements of the feature vector, resulting in less computation for a processor, thus, improving performance of the speech recognition processing. Performance may be further improved via use of Single Instruction Multiple Data (SIMD) processing for pre-computing the LUT. As such, according to embodiments disclosed herein, fMMI processing may be accelerated overall (e.g., by more than a factor of 3), enabling a speech recognition system to perform speech recognition processing with few resources on either slower hardware or in more complex domains.

Figure 1:
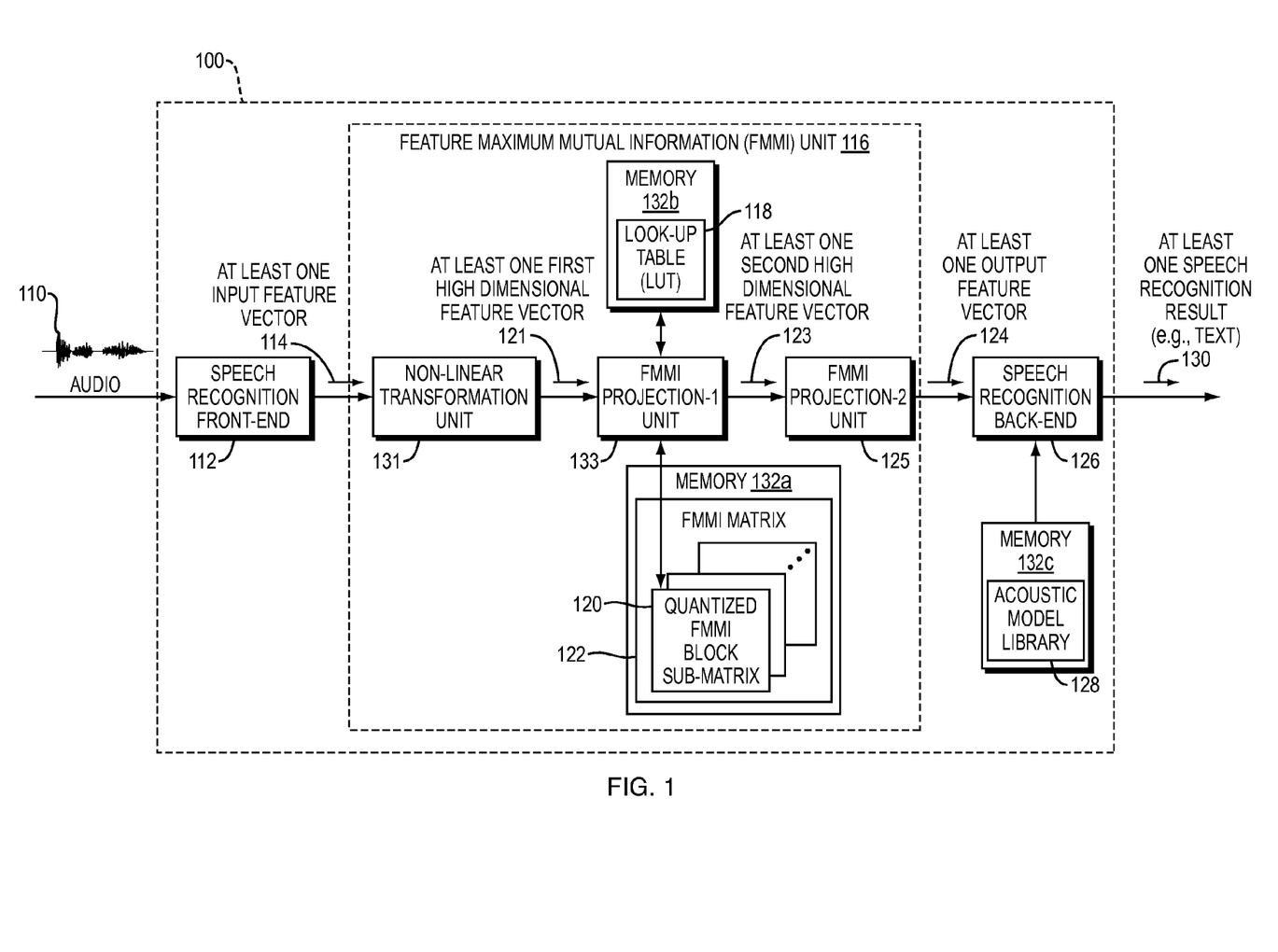
FIG. 1 is a block diagram of an example embodiment of a speech recognition system.

FIG. 1 is a block diagram of an example embodiment of the present invention of a speech recognition system 100. At least one speech signal 110 is provided by a user (not shown) to the speech recognition system 100. The at least one speech signal 110, a sample of the user's voice, taken, for example, during a time frame such as 10 ms, 12.5 ms, 20 ms, or any other suitable time frame, may be one or more utterances spoken by the user. The speech signal may be received via a hardware speech interface (not shown) of the speech recognition system 100.

According to at least one example embodiment, the speech recognition system 100 may include a speech recognition front-end 112, a Feature Maximum Mutual Information (FMMI) unit 116, and a speech recognition back-end 126. The speech recognition front-end 112 may be configured to produce at least one input feature vector 114, from the at least one speech signal 110, for input to the FMMI unit 116. The at least one input feature vector 114 may be transformed by a non-linear transformation unit 131 into a high dimensional space, such as by a Gaussian transformation, or any other suitable transformation method, thereby producing at least one first high dimensional feature vector 121 that may be a very large transformed feature vector that is input to an FMMI projection-1 unit 133 of the FMMI unit 116.

The FMMI projection-1 unit 133 may be configured to multiply the at least one first high dimensional feature vector 121 (i.e., the transformed feature vector) by a full and very large FMMI matrix 122 that is divided into at least one quantized FMMI block sub-matrix 120. The FMMI matrix 122 may be stored in a first memory 132a. The FMMI projection-1 unit 133 may be further configured to subdivide the at least one first high dimensional feature vector 121 (i.e., a transformed feature vector) into sub-vectors (not shown) each having a length P corresponding to the row length of the at least one quantized FMMI block sub-matrix. The FMMI projection-1 unit 133 may be further configure to dot multiply each sub-vector with each row of each corresponding quantized FMMI block sub-matrix to produce an intermediate dot product.

Since a sub-vector may have a large number of elements, according to embodiments disclosed herein, a dot product of the sub-vector with the quantized FMMI block sub-matrix may include subdividing the sub-vector of length P into sub-sub-vectors of length L and first computing intermediate dot products of length L, using a Look-Up Table 118, wherein summation of the intermediate dot products yields the dot product of the sub-vector with a given quantized FMMI block sub-matrix of the at least one quantized FMMI block sub-matrix. According to embodiments disclosed herein, for each consecutive L elements of the sub-vector P, a different lookup table is computed.

In an event a sub-vector of length P is not a multiple of L, the remainder L' may be handled with another LUT (not shown) of a smaller length $2^{L'}$. The length of L may be 8, or any other suitable value; however, 8 has a benefit of leading to a LUT 118 of size 256 entries. The at least one quantized FMMI block sub-matrix 120 may be stored in a first memory 132a and the LUT 118 may be stored in a second memory 132b. The first memory 132a and the second memory 132b may be the same or different storages devices of the speech recognition system 100.

The FMMI projection-1 unit 133 may be further configured to obtain a dot product value of the at least one first high dimensional feature vector 121 with the full FMMI matrix 122 by summing each of the intermediate dot products to produce at least one second high dimensional feature vector 123 that is an enhanced form (i.e., an enhanced feature vector) of the at least one input feature vector 114. The at least one second high dimensional feature vector 123 may be input to an FMMI Projection-2 unit 125 of the FMMI Unit 116 that may be configured to reduce the length of the at least one second high dimensional feature vector 123, producing at least one output feature vector 124 for input to the speech recognition back-end 126.

The at least one output vector 124 may be used in conjunction with an acoustic model language vocabulary of an acoustic model library 128 by the speech recognition back-end 126 to produce at least one recognized speech result 130. According to embodiments disclosed herein, the at least one recognized speech result 130 may be based on a plurality of the at least one output vector 124 received from the FMMI unit 116. The at least one recognized speech result 130 may be text, or any other suitable recognized speech result. The acoustic model library 128 may be stored in a third memory 132c that may be a storage device that is separate from or the same as either the first memory 132a or the second memory 132b, or a combination thereof.

Figure 2:
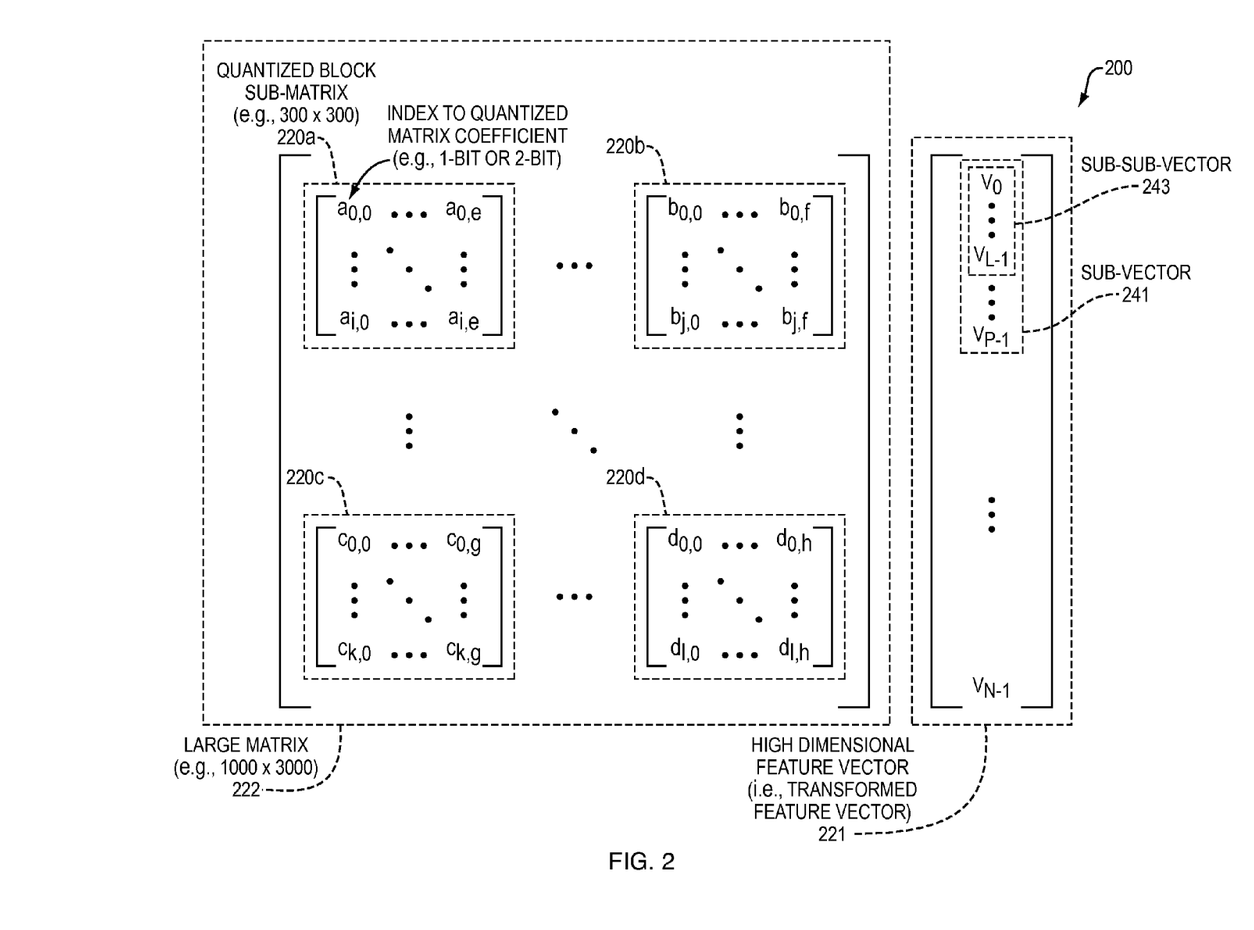
FIG. 2 is a block diagram of an example embodiment of a matrix that is subdivided into a plurality of block submatrices for multiplying with a feature vector.

FIG. 2 is a block diagram 200 of an FMMI matrix 222, such as the FMMI matrix 122 of FIG. 1, that is subdivided into a plurality of block sub-matrices 220a-d for multiplying with a sub-sub-vector 243 that is a sub-sub-vector of a sub-vector 241 of a high dimensional feature vector 221 (i.e., a transformed feature vector), such as the at least one first high dimensional feature vector 121 of FIG. 1, wherein the high dimensional feature vector 221 is of length N, the sub-vector (i.e., sub-feature-vector) is of length P, and the sub-sub-vector 243 (i.e., sub-sub-feature-vector) is of length L. The high dimensional feature vector 221 is subdivided into sub-vectors of length P, such as the sub-vector 241 that may be subdivided into sub-sub-vectors of length L, such as the sub-sub-vector 243.

The matrix 222 may be a large (e.g., 1000×3000) multi-dimensional FMMI matrix. The FMMI matrix may be subdivided into block sub-matrices 220a-d that each have smaller dimensions (e.g., 300×300) than the larger FMMI matrix 222. It should be understood that the example dimensions are for illustrative purposes only and that dimensions of the matrix 222 and the block sub-matrices 220a-d may be any suitable dimensions. A total number of the block sub-matrices 220a-d may be any suitable number. Further, since the block sub-matrices 220a-d are block matrices, dimensions of such matrices need not be square. In addition, dimensions of the plurality of block sub-matrices 220a-d need not be the same.

The elements of the block sub-matrices 220a-d may be indices to quantized element values, wherein the indices point to entries in a LUT (not shown) that stores the quantized element values. Alternatively the block sub-matrices 220a-d may store the quantized element values. According to one embodiment, the elements may be quantized (i.e., compressed) to one-bit values. For example, each element of the block sub-matrices 220a-d may be quantized into one of two values. Such quantization may be referred to herein as a one-bit quantization case. Multiplication of the sub-sub-vector 243 with a quantized block sub-matrix for the one-bit quantization case is disclosed below with reference to FIG. 3.

According to another embodiment, the elements may be quantized (i.e., compressed) to two-bit values. For example, each element of the block sub-matrices 220a-d may be quantized into one of four values. Such quantization may be referred to herein as a two-bit quantization case. Multiplication of the sub-sub-vector 243 with a quantized block sub-matrix for the two-bit quantization case is disclosed below with reference to FIG. 4. According to one embodiment, a row dimension of a given quantized block sub-matrix of the plurality of quantized block sub-matrices 220a-d may be equivalent to the length L of the sub-sub-vector 243.

Subdividing the FMMI matrix 222 into the plurality of quantized block sub-matrices 220a-d enables a speech recognition system, such as the speech recognition system 100 of FIG. 1, to perform multiplication of large transformed feature vectors, such as the at least one first high dimensional feature vector 121 of FIG. 1, or the high dimensional feature vector 221 of FIG. 2, enabling FMMI processing on a platform, such as an embedded platform, that may have limited storage resources available. For example, the speech recognition system may be an embedded platform, such as a mobile device, or any other suitable embedded platform, that has limited storage resources available.

A method for quantizing (also referred to interchangeably herein as compressing) the elements for the one-bit quantization case or the two-bit quantization case may be any suitable quantization (also referred to interchangeably herein as compression) method currently known or hereinafter developed. The quantization for the one-bit quantization case and the two-bit quantization case may include converting floating point numbers to a limited number of quantized floating point or integer numbers (q0, q1, q2 . . . ). The matrix is then compressed by replacing the limited number of floating point or integer numbers by a 1 or 2 bit indices. The actual values can be retrieved (i.e., decompressed) by indexing into another lookup table (not shown) that stores the actual values of the floating point or integer numbers. As disclosed above, methods disclosed herein may use the compressed indices and obviate a need for a de-compression method to de-compress the 1-bit or 2-bit values to a floating point value. Embodiments disclosed herein enable such a de-compression method to be avoided. It should be understood that compression as disclosed herein includes a conversion from the quantizes value (e.g., q0, q1, etc.) to the 1 or 2 bit indices, and that quantizing reduces the unlimited number of different values to a limited number of different values.

Figure 3:
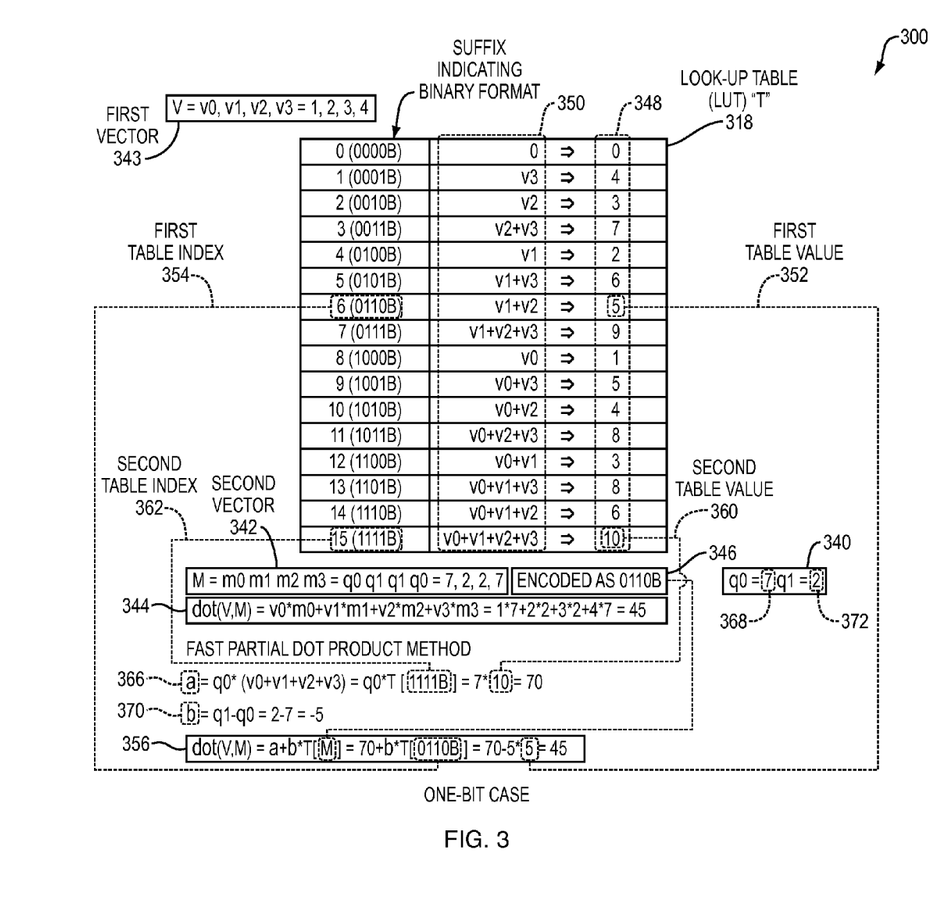
FIG. 3 is a block diagram of an example embodiment of computing a dot product for a one-bit quantization case.

FIG. 3 is a block diagram 300 of an example embodiment of computing a dot product for a one-bit quantization case referred to above with regard to FIG. 2. In the example embodiment, a sub-sub-vector 343 (i.e., sub-sub-feature-vector or partial feature vector) has a vector length L of four and includes multiple vector elements, namely vector elements V0, V1, V2, and V3 that have values 1, 2, 3, and 4, respectively. It should be understood that the number of vector elements, for example, four in the example embodiment, is for illustrative purposes and that the sub-sub-vector 343 may have any suitable number of vector elements.

A common operation for an FMMI method may be to compute a dot product value between the high dimensional feature vector 221 and each of a number of rows of an FMMI matrix, such as the FMMI matrix 222 of FIG. 2. As disclosed above with regard to FIG. 2, the FMMI matrix 222 may be subdivided into the plurality of quantized block sub-matrices 220a-d. Further, the high dimensional feature vector 221 may be subdivided into multiple sub-vectors 241 that may be subdivided into multiple sub-sub-vectors, such as the sub-sub-vector 243. As such, the FMMI method may require computing multiple dot product values, such as a respective dot product value for each dot product computation between each sub-sub-vector 243 and each respective row of the plurality of quantized block sub-matrices 220a-d. Embodiments disclosed herein enable fewer mathematical operations to compute each respective dot product value relative to a standard dot product computation of the high dimensional feature vector 221 and each respective row of the plurality of quantized block sub-matrices 220a-d.

For example, as part of the FMMI method, a dot product value between the sub-sub-vector 343 and each of the i rows of a quantized block sub-matrix, such as the quantized block sub-matrix 220a, may need to be computed. Each row of the quantized block sub-matrix may be referred to as a vector $M_i$, or may simply be referred to as M. Such dot product computation (also referred to interchangeably herein as dot product vector computation) of the feature vector V with $M_i$ may be performed via standard dot product computation as:

$$Result=dot(V,M_i)=sum(V_j*M_{i,j})=V_0*M_{i,0}+V_1*M_{i,1}+V_2*M_{i,2}+\ldots$$

In the example embodiment of FIG. 3, the length of the sub-sub-vector 343 is four, and the length of a row M is four. The sub-sub-vector 343 may be referred to herein as a first vector, and M may be referred to herein as a second vector. For the one-bit quantization case, the second vector 342, M, is encoded as two different elements, q0 and q1, due to the one-bit quantization.

In the example embodiment of FIG. 3, the one-bit quantization values 340, that include q0 and q1, have values of 7 and 2, respectively. For example purposes, the second vector 342 has quantized element values of m0, m1, m2, and m3, that are q0, q1, q1, and q0; that is, 7, 2, 2, 7, respectively. As such, standard dot product computation of the dot product value 344 between the sub-sub-vector 343 and the second vector 342 is performed as:

$$Result=dot(V,M_i)=v0*m0+v1*m1+v2*m2+v3*m3=1*7+2*2+3*2+4*7=45.$$

As such, computation of the dot vector product value 344 by a processor requires four multiplications and three accumulation mathematical operations via the standard dot product computation.

According to embodiments disclosed herein, the processor may use fewer mathematical operations than standard approaches to compute the dot product value 344 of the first and second vectors to reduce a number of mathematical operations for dot vector product computations between a fixed vector V, such as the sub-sub-vector 343, and a number of row vectors $M_i$, such as the second vector 342, M, of the block sub-matrix.

To reduce a number of mathematical operations for the dot vector product computation, embodiments disclosed herein may pre-compute a Look-Up Table (LUT) 318. The pre-computed LUT 318 may be re-used multiple times, once for each dot vector product computation of the sub-sub-vector 343 with the row M of the matrix, wherein M is a row of a quantized block sub-matrix, such as any of the quantized block sub-matrices 220a-d of FIG. 2, that intersects with the sub-sub-vector 343 (e.g., once per row). The pre-computed LUT 318 may be pre-computed once for each sub-sub-vector 343. According to embodiments disclosed herein, the LUT 318 may include a plurality of table values 348 each corresponding to a unique summation of vector elements 350. The LUT 318 is also referred to interchangeably as T in FIG. 3.

Embodiments disclosed herein may encode the second vector 342. The encoded form 346 may be combination of the quantized element values of the second vector 342. For example, the encoded form may be a binary encoding of the quantized element values of the second vector, each 1-bit value in the binary encoding corresponding to a respective quantized element value of the quantized element values q0 and q1 of M. As such, the encoded form 346 is 0110B in the example embodiment, as shown in FIG. 3. It should be understood that the suffix "B" designates a binary value.

Embodiments disclosed herein may obtain a table value 352, from a plurality of table values 348 each corresponding to a unique summation of vector element values of the first vector 343, via an index 354 corresponding to an encoded form 346 of a combination of quantized element values of the second vector 342. Embodiments disclosed herein may compute a dot product value 356 of the first vector 343 and the second vector 342 using the table value 352 obtained, the vector element values 358, and the quantized element values 340.

The table value 352 may be referred to herein as a first table value. The index 354 may be referred to herein as a first index. Embodiments disclosed herein may obtain a second table value 360 from the plurality of table values 348 via a second index 362. The second index 362 may be a predetermined index of an entry in the LUT 318 that has a second table value 360 that corresponds to a sum value of the vector element values 358, for example, T[15] (i.e., T[1111b]) in the example embodiment.

Embodiments disclosed herein may compute a first variable value 366 by multiplying a first quantized element value 368 of the quantized element values 340 with the second table value 360 obtained, and compute a second variable value 370 as a difference between the first quantized element value 368 from a second quantized element value 372 of the quantized element values 340. Alternatively, the first variable value may be pre-computed by summing the values of each of the first vector element values. The first variable value 366 and the second variable value 370 may be pre-computed, once for each sub-matrix. For example, the first variable value 366 and the second variable value 370 may be pre-computed and then reused for each dot-product computation of the sub-sub-vector 343 with each row M of a given block sub-matrix.

According to embodiments disclosed herein, the dot product value 356 for the one-bit quantization case may be computed by adding the first variable value 366 to a product of the second variable value 370 and the first table value 352 obtained.

As such, the dot product value 356 has a resulting value of 45, in the example embodiment, that is the same result achieved by the standard dot product computation of the dot product value 344. However, in contrast to the 4 multiplications and 3 additions needed for the standard dot product computation of the dot product value 344, the dot product value 356, according to embodiments disclosed herein, requires 1 multiplication, 1 addition, and 1 lookup. In addition to the cost savings for a reduced number of mathematical operations for computation of the dot product, embodiments disclosed herein provide an additional benefit of obviating a need for a de-compression method to decompress the 1-bit matrix into a matrix with values q0 and q1.

Another example of the one-bit case, according to embodiments disclosed herein, includes second vector M again having only two different elements m0 and m1, but with associated values of 0 and 1, respectively. The second vector M is encoded and compressed with one bit per element to encode either q0 or q1. In the example embodiment, a feature vector V has eight elements, and a computation for the partial dot product is performed 8 elements at a time. For example:

V=v0 v1 v2 v3 v4 v5 v6 v7, and
M=0 1 0 1 0 0 1 0 encodes as q0 q1 q0 q1 q0 q0 q1 q0.

Since the feature vector V has 8 elements, the precomputed LUT T has 256 elements, each corresponding to a unique summation of vector elements. As such, the LUT T computes for each possible value M the result of dot(V, M).

According to embodiments disclosed herein, dot(V, M)=a+b*T[M], where the first variable a=q0*(v0+v1+v2+ v3+v4+v5+v6+v7), or, alternatively, q0*T[(2^8)−1=255], and the second variable b=q1−q0, requiring 1 multiplication, 1 addition, and 1 lookup, as variables a and b are precomputed. A standard dot product computation for the same result would require 8 multiplications and 7 additions.

Figure 4:
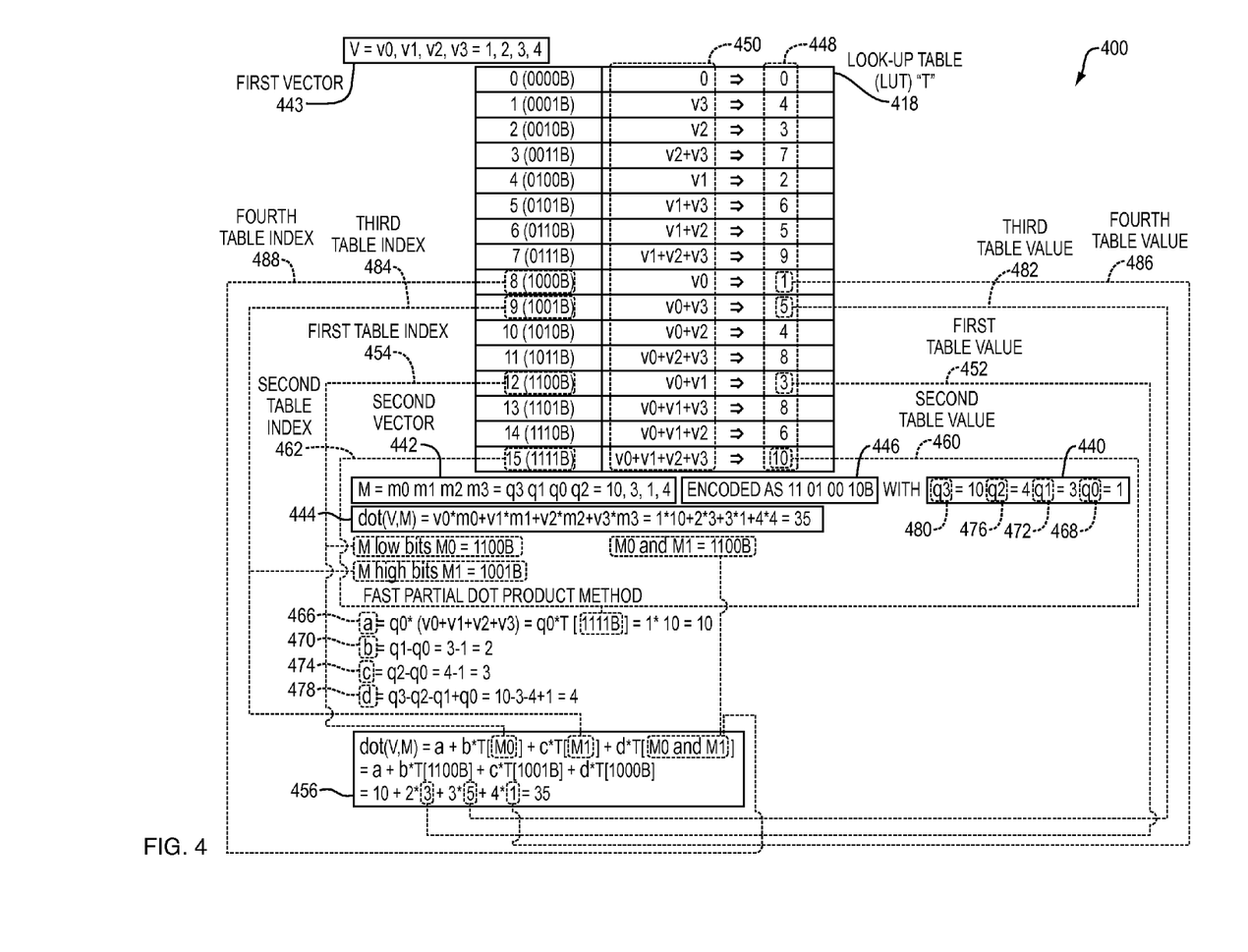
FIG. 4 is a block diagram of an example embodiment of computing a dot product for a two-bit quantization case.

FIG. 4 is a block diagram of an example embodiment of computing a dot product for the two-bit quantization case referred to above with regard to FIG. 2. In the example embodiment of FIG. 4, the length of the sub-sub-vector 443 is again four and the length of M is again four. Similar to the example embodiment of the one-bit case of FIG. 3, the sub-sub-vector 443 (i.e., sub-sub-feature-vector or partial feature vector) of FIG. 4 may be referred to as a first vector and M may be referred to as the second vector.

In the example embodiment, the second vector 442, M, now has four different elements, m0, m1, m2, and m3. The second vector is encoded and compressed with two bits per element to encode either q0, q1, q2 or q3 that have values of 1, 3, 4, and 10, respectively. It should be understood that each element of M may be any one of the four different elements, q0, q1, q2, or q3. For example purposes, the second vector 442 is encoded as q3, q1, q0, q2. As such, standard dot product computation of the dot product value 444 between the sub-sub-vector 443 and the second vector 442 is performed as:

$$Result_i = dot(V, M_i) = v0*m0 + v1*m1 + v2*m2 + v3*m3 = 1*10 + 2*3 + 3*1 + 4*4 = 35.$$

As such, computation of the dot vector product value 444 by a processor requires four multiplications and three accumulation mathematical operations via the standard dot product computation.

Similar to the example embodiment of the one-bit case of FIG. 3, according to embodiments disclosed herein, the processor may use fewer mathematical operations than standard approaches to compute the dot product value 444 of the first and second vectors to reduce a number of mathematical operations for dot vector product computations between a fixed vector V, such as the sub-sub-vector 443 (i.e., partial feature vector), and a number of row vectors $M_i$ of the matrix.

To reduce a number of mathematical operations for the dot vector product computation, embodiments disclosed herein may pre-compute a LUT 418 in the same manner that the LUT 318 of FIG. 3 is computed. Similar to the LUT 318, the LUT 418, also referred to as T in FIG. 4, may be re-used multiple times, once for each dot vector product computation of the sub-sub-vector 443 with the row $M_i$ of the matrix. According to embodiments disclosed herein, the LUT 418 may include a plurality of table values 448 each corresponding to a unique summation of vector elements 450.

Embodiments disclosed herein may encode the second vector 442. The encoded form 446 may be a combination of the quantized element values of the second vector 442. For example, the encoded form may be a binary encoding of the quantized element values of the second vector, each 2-bit value in the binary encoding corresponding to a respective quantized element value of the quantized element values q0, q1, q2, and q3. As such, the encoded form 446 is 11 01 00 10 in the example embodiment. According to embodiments disclosed herein, a vector M0 may include the lower order bits from M, and a vector M1 may include the higher order bits from M.

Embodiments disclosed herein may obtain a table value 452, from a plurality of table values 448 each corresponding to a unique summation of vector element values of the first vector 443, via an index 454 corresponding to an encoded form 446 of a combination of quantized element values of the second vector 442. The index 454 may correspond to M0, that is, the lower order bits from M. Embodiments disclosed herein may compute a dot product value 456 of the first vector 443 and the second vector 442 using the table value 452 obtained, the vector element values 458, and the quantized element values 440.

The table value 452 may be referred to herein as a first table value. The index 454 may be referred to herein as a first index. The first index 454 may correspond to lower order bits from the encoded form 446, that is, M0. Embodiments disclosed herein may obtain a second table value 460 from the plurality of table values 448 via a second index 462. The second index 462 may be a pre-determined index of an entry in the LUT 418 that has a second table value 460 that corresponds to a sum value of the vector element values 458. Alternatively, the second table value 460 may be computed by summing each of the vector element values 458, obviating the look-up operation.

Embodiments disclosed herein may compute a first variable value 466 by multiplying a first quantized element value 468 of the quantized element values 440 with the second table value 460 obtained, a second variable value 470 by computing a difference between the first quantized element value 468 and a second quantized element value 472 of the quantized element values 440, a third variable value 474 by subtracting the first quantized element value 468 from a third quantized element value 476 of the quantized element values 440, and a fourth variable 478 by adding the first quantized element value 468 to a fourth quantized element value 480 of the quantized element values 440, subtracting the second quantized element value 472 from the fourth quantized element value 480, and subtracting the third quantized element value 476 from the fourth quantized element value 480.

According to embodiments disclosed herein, a third table value 482 may be obtained via a third index 484, and a fourth table value 486 may be obtained via a fourth index 488. The third index 484 may correspond to the higher order bits from the encoded form 446, that is M1. The fourth index may correspond to a result of a bitwise and operation between the higher order bits and the lower order bits of the encoded form 446; that is a bitwise and operation of M0 and M1. The first variable value 466, the second variable value 470, the third variable 474, and the fourth variable 478 may be pre-computed along with the LUT 418 and then reused for each dot-product computation of the sub-sub-vector 443 with each row M of a given block sub-matrix.

According to embodiments disclosed herein, the dot product value 456 for an embodiment of two-bit quantization may be computed by summing the first variable value 466, a first product value computed by multiplying the second variable value 470 and the first table value 454 obtained, a second product value computed by multiplying the third variable value 474 and the third table value 484 obtained, and a third product value computed by multiplying the fourth variable value 478 and the fourth table value 486 obtained.

As such, the dot product value 456 has a resulting value of 35, the same result achieved via the standard dot product computation of the dot product value 444; however, the dot product value 456 requires 3 multiplications, 3 additions, and 3 lookups, as compared to the 4 multiplications and 3 additions of the standard dot product computation of the dot product value 444. The cost savings become more apparent with vectors of more elements, such as 8, as the number of computations for the former method does not increase with the length of the vector, whereas the latter method does. In addition to such cost savings for a number of mathematical operations for computation of the dot product, embodiments disclosed herein provide an additional benefit of obviating a need for a de-compression method to decompress the 2-bit matrix into a matrix with values q0, q1, q2, and q3.

In another example of the two-bit case, the dot product is computed for 8 elements at a time according to example embodiment disclosed herein. For example, the first vector has a length L of 8 and is:

V=v0 v1 v2 v3 v4 v5 v6 v7, and the second vector is:

M=0 2 0 3 1 0 1 2, that encodes as q0 q2 q0 q3 q1 q0 q1 q2.

The vector M is encoded with 2 1-bit vectors:

M0=0 0 0 1 1 0 1 0 and

M1=0 1 0 1 0 0 1 1.

The vector M0 encodes the low bits of M, and M1 encodes the high bits of M.

Again a LUT T is precomputed, in the same way as in the one-bit case. According to example embodiments disclosed herein:

$$\text{dot}(V,M) = a + b*T[M0] + c*T[M1] + d*T[M0 \text{ and } M1]$$

wherein:
a=q0*(v0+v1+v2+v3+v4+v5+v6+v7), or, alternatively, q0*T[(2^8)−1=255]
b=q1−q0
c=q2−q0
d=q3+q0−q1−q2.

As such, the dot vector product computation requires 3 multiplications, 3 additions, and 3 lookups, wherein a, b, c, and d are pre-computed. A dot vector product performed in a standard manner would require 8 multiplications and 7 additions. Additionally, such standard computation would result in additional overhead needed to decompress the two-bit matrix into a matrix with values q0, q1, q2, q3.

It should be understood that feature vector lengths of eight and four are for illustrative purposes and that embodiments disclosed herein may be applied to feature vectors of any suitable length. For example, a vector length may be L=4, 8, 12, or any other suitable length. The longer the length the more effective the method becomes, but the pre-computed table, such as that pre-computed tables LUT 118, LUT 318, and LUT 418, of FIG. 1, FIG. 3, and FIG. 4, respectively, also grows to a size 2^L (e.g., 2^L table entries), resulting in more overhead for pre-computing the table and slower look-up (due to more processor cache usage) performance.

It should be understood that computation of a, b, c, and d is a fixed overhead independent of the number of dot products computed, i.e., number of rows in the sub-matrix, and that multiplication with a, b, c, and d, as illustrated above, and in FIG. 3 and FIG. 4, is a fixed overhead, independent of the total vector length N of the feature vector (which is processed in pieces of length L). This is because dot(V,M) is a+b*(T1[ ]+T2[ ]+ . . . )+c*(T1[ ]+T2[ ]+ . . . )+d*(T1[ ]+T2[ ]+ . . . ), wherein T1, T2, . . . are look-up tables computed for each L piece of N (e.g., L=8, N=80, so T1, . . . T10) and a is precomputed as q0*(v0+v1+ . . . +$V_{N-1}$).

For a large vector of length N divided into sub-vectors of length P divided into sub-vectors of length L, for example, N may be 80 and L may be 8, conventional methods based on a standard dot product computation and decompression would require N multiples, N−1 additions and N decompression lookups, and thus, in total, 80 multiplies, 79 additions, and 80 decompression lookup operations. In contrast, according to embodiments disclosed herein, the same result can be achieved via 1 multiplication, N/L additions, and N/L lookup operations, resulting in 1 multiplication, 10 additions, and 10 lookups based the 1-bit case method, disclosed above. Further, using the 2-bit case method, disclosed above, the same result can also be achieved via 3 multiplies, 3*N/L additions, and 3*N/L lookups, resulting in 4 multiplies, 30 additions, and 30 lookups. As such, the 1-bit case enables approximately (80+79)/(1+10)=14 times fewer computations and 8 times fewer lookups than conventional methods, while the 2-bit case enables approximately (80+79)/(3+30)=4.8 times fewer computations and 2.6 times fewer lookups than conventional methods.

Further, while embodiments disclosed herein may incur an overhead cost for pre-computing N/L tables of, for example, 256 elements, but for large matrices with many rows (e.g., greater than 256), this overhead becomes small.

Figure 5A:
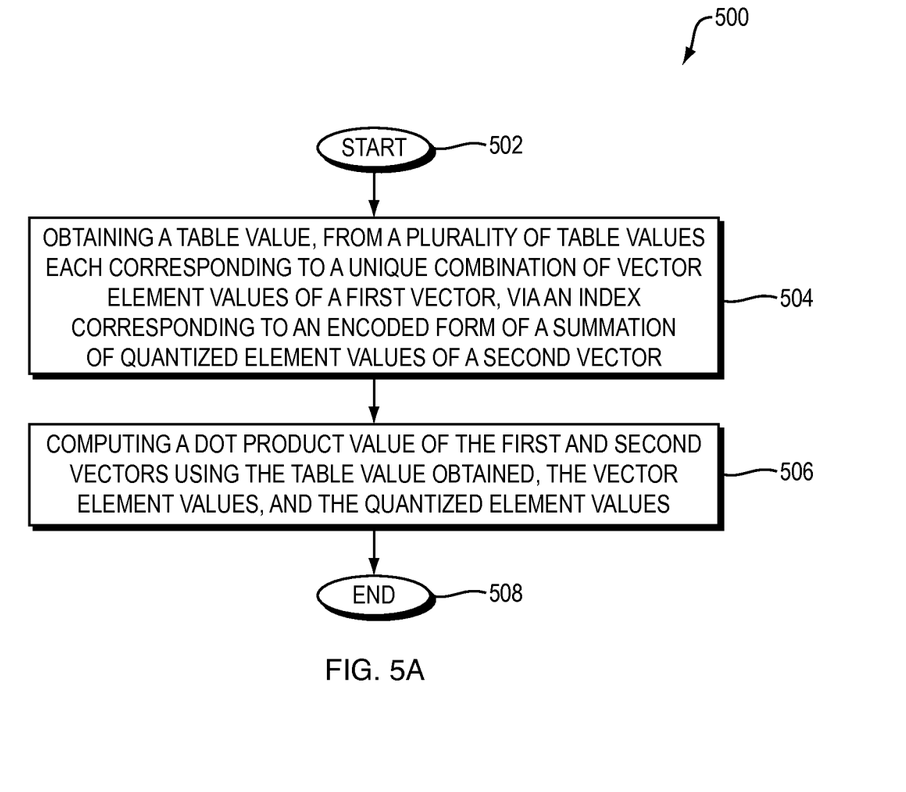
FIG. 5A is a flow diagram of an example embodiment of a method for improving performance of speech recognition processing in an electronic device.

FIG. 5A is a flow diagram 500 of an example embodiment of a method for improving performance of speech recognition processing in an electronic device. The method may start (502) and, by a processor of the electronic device, the method may comprise obtaining a table value, from a plurality of table values each corresponding to a unique summation of vector element values of a first vector, via an index corresponding to an encoded form of a combination of quantized element values of a second vector (504). The method may further comprise, by the processor, computing a dot product value of the first and second vectors using the table value obtained, the vector element values, and the quantized element values, the processor using fewer mathematical operations to compute the dot product value relative to a standard dot product computation of the first and second vectors, the speech recognition processing performing multiple dot product computations (506), and the method thereafter ends (508) in the example embodiment.

Figure 5B:
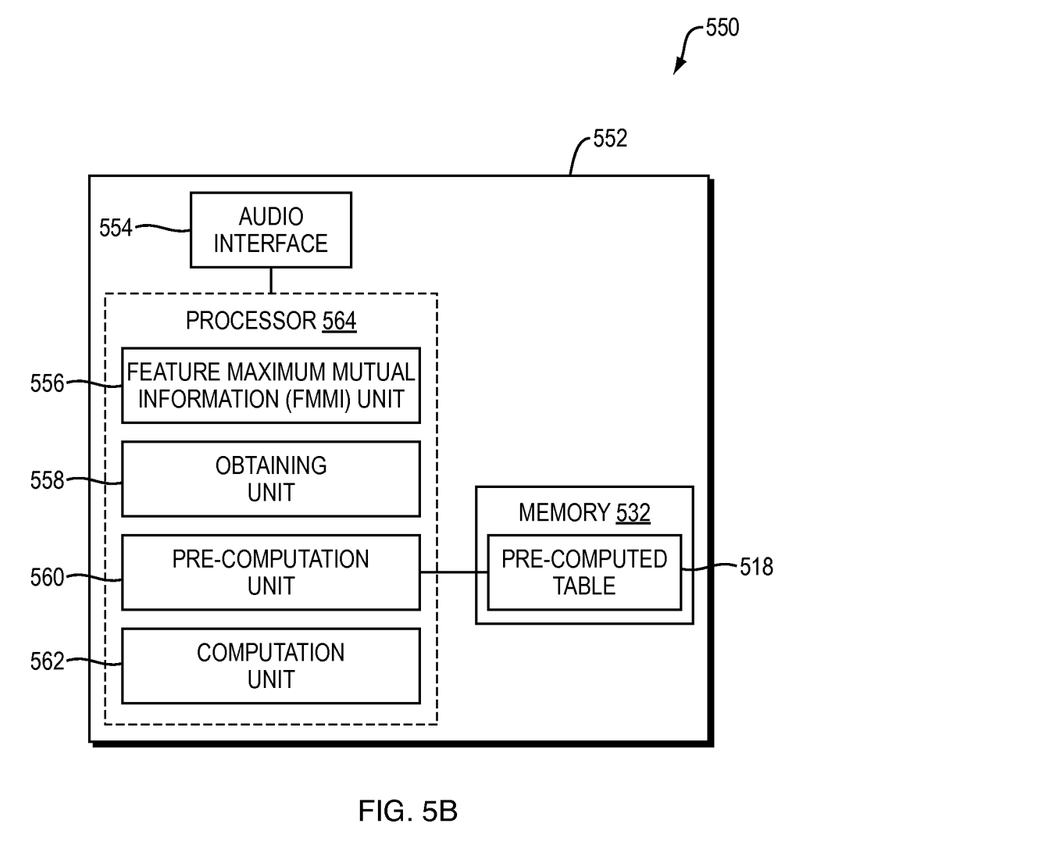
FIG. 5B is a block diagram of an example embodiment of an apparatus for improving performance of speech recognition processing.

FIG. 5B is a block diagram 550 of an example embodiment of an apparatus 552 for improving performance of speech recognition processing. The apparatus 552 may include an audio interface 554 coupled to a processor 564 of the apparatus 552 and, by the processor 564: an obtaining unit 558 may obtain a table value, from a plurality of table values each corresponding to a unique summation of vector element values of a first vector, via an index corresponding to an encoded form of a combination of quantized element values of a second vector, and a computation unit 562 may compute a dot product value of the first and second vectors using the table value obtained, the vector element values, and the quantized element values, the processor 564 using fewer mathematical operations to compute the dot product value relative to a standard dot product computation of the first and second vectors, the speech recognition processing performing multiple dot product computations.

The apparatus 552 may further comprise, by the processor 564: a feature Maximum Mutual Information (fMMI) unit 556, and the quantized element values of the second vector correspond to quantized coefficients of a matrix that may be computed by the fMMI unit 556.

The apparatus 552 may further comprise, by the processor 564: a pre-computation unit 560 to pre-compute a table 518 including the plurality of table values and use the pre-computed table 518 multiple times for a subset of the multiple dot product computations performed. The pre-computed table 518 may be stored in a memory 532 of the apparatus 552.

Further, an example embodiment of a mathematical derivation follows.

According to embodiments disclosed herein, a LUT, such as the LUT 318 and LUT 418, also referred to interchangeably herein as "T," may have the following properties:

The lookup of binary encoding M0 is equal to the dot product of M0 seen as a binary vector, i.e., a vector with element values either 0 or 1.

$$T[M0] = \text{dot}(V, M0) \quad (1)$$

Given that, it can be shown that for binary encodings M0, M1

$$T[M0 \text{ and } M1] = T[M0] - T[M0 \text{ and not } M1] \quad (2)$$

And that with $M1 = 1 \ldots 1$ being binary encoding with all bits 1

$$T[M0] = T[1 \ldots 1] - T[\text{not } M0] \quad (3)$$

For the 1-bit case disclosed above:
With M0 being the binary encoding of M
The vector M can be written in terms of its binary encoding M0 seen as a binary vector and the quantized element values q0 and q1 as $M = q0^* \text{not } M0 + q1^* M0$ So $\text{dot}(V,M) = q0^* \text{dot}(V \text{ not } M0) + q1^* \text{dot}(V, M0)$ And by (1) and (2)

$$\text{dot}(V,M) = q0^*(T[1 \ldots 1] - T[M0]) + q1^* T[M0]$$

So $$\text{dot}(V,M) = q0^* T[1 \ldots 1] + (q1-q0)^* T[M0]$$

$$\text{dot}(V,M) = a + b^* T[M0]$$

Proving that $a = q0^* T[1 \ldots 1]$ and $b = q1 - q0$.

For the 2-bit case disclosed above:
Below, a bitwise AND operator is abbreviated as '&' and a bitwise NOT operator is abbreviated as '!'.
The vector M can be written in terms of its binary encodings M0 and M1 seen as binary vectors and the quantized element values as q0, q1, q2 and q3.

$$M = q0^*(!M0 \ \& \ !M1) + q1^*(M0 \ \& \ !M1) + q2^*(!M0 \text{ and } M1) + q3^*(M0 \ \& \ M1)$$

And thus by (1)

$$\text{dot}(V,M) = q0^* T[!M0 \ \& \ !M1] + q1^* T[M0 \ \& \ !M1] + q2^* T[!M0 \ \& \ M1] + q3^* T[M0 \ \& \ M1] \quad (1A).$$

Using (2)

$$T[M0 \ \& \ !M1] = T[M0] - T[M0 \ \& \ M1] \quad (4)$$

$$T[!M0 \ \& \ M1] = T[M1] - T[M0 \ \& \ M1] \quad (5)$$

Using (3) and (4)

$$T[!M0 \ \& \ !M1] = T[!M0] - T[!M0 \ \& \ M1] = T[1 \ldots 1] - T[M0] - T[M1] + T[M0 \ \& \ M1] \quad (6)$$

Substituting (4) (5) and (6) in (1A) results in:

$$\text{dot}(V,M) = q0^* T[1 \ldots 1] + (q1-q0)^* T[M0] + (q2-q0)^* T[M1] + (q3-q1-q2+q0)^* T[M0 \ \& \ M1] \quad (1B)$$

$$\text{dot}(V,M) = a + b^* T[M0] + c^* T[M1] + d^* T[M0 \text{ and } M1]$$

Proving that $a = q0^* T[1 \ldots 1]$, $b = q1-q0$, $c = q2-q0$ and $d = q3-q1-q2+q0$ For a case of more than 2 bits:
In similar fashion, the dot product can be computed in case of 3 bits or more. For 3 bits, the dot product can be derived from a generic formulation similar as (1A) now based on M0, M1 and M2:

$$\text{dot}(V,M) = a + b^* T[M0] + c^* T[M1] + d^* T[M2] + e^* T[M0 \text{ and } M1] + f^* T[M0 \text{ and } M2] + g^* T[M1 \text{ and } M2] + h^* T[M0 \text{ and } M1 \text{ and } M2]$$

However the computation becomes relatively less efficient with this computation compared to the normal dot computation, unless the vector length is increased to, for example, 16, which results in a large lookup table resulting in slower lookup (as CPU cache size is limited) and more overhead for pre-computation.

Further, it should be understood that a number of quantized elements may not be a power of two. For example, in the example embodiment of the 2-bit case of FIG. 4, disclosed above, three different quantized element values, such as q0, q1, and q2, may have be used instead of four. As such, for such a case in which there are less quantized element values as the number of bits permit, that is, 3 quantized element values, whereas 2^2 permits four. The above formulations may still be applied excluding some of the terms. For example, if q3 is not present, then the bitwise AND (M0 and M1) will always be 0, as both the low and high order bits of an encoded index cannot be set at the same time. Thus, either the low or high order bits will be 0 and, thus, (M0 & M1) is 0 and also T[M0 & M1]=0. As such, with only the three quantized element values q0, q1, and q3, according to embodiments disclosed herein, the dot product can be computed as:

$$dot(V,M)=a+b*T[M0]+c*T[M1]$$

with a=q0*T[1 . . . 1], b=q1−q0, and c=q2−q0.

Similarly, for three-bit case disclosed above, with for example, 5, 6, and 7 quantized element values instead of 8, the formulation for the three bit case can be applied by dropping suitable terms.

Figure 6:
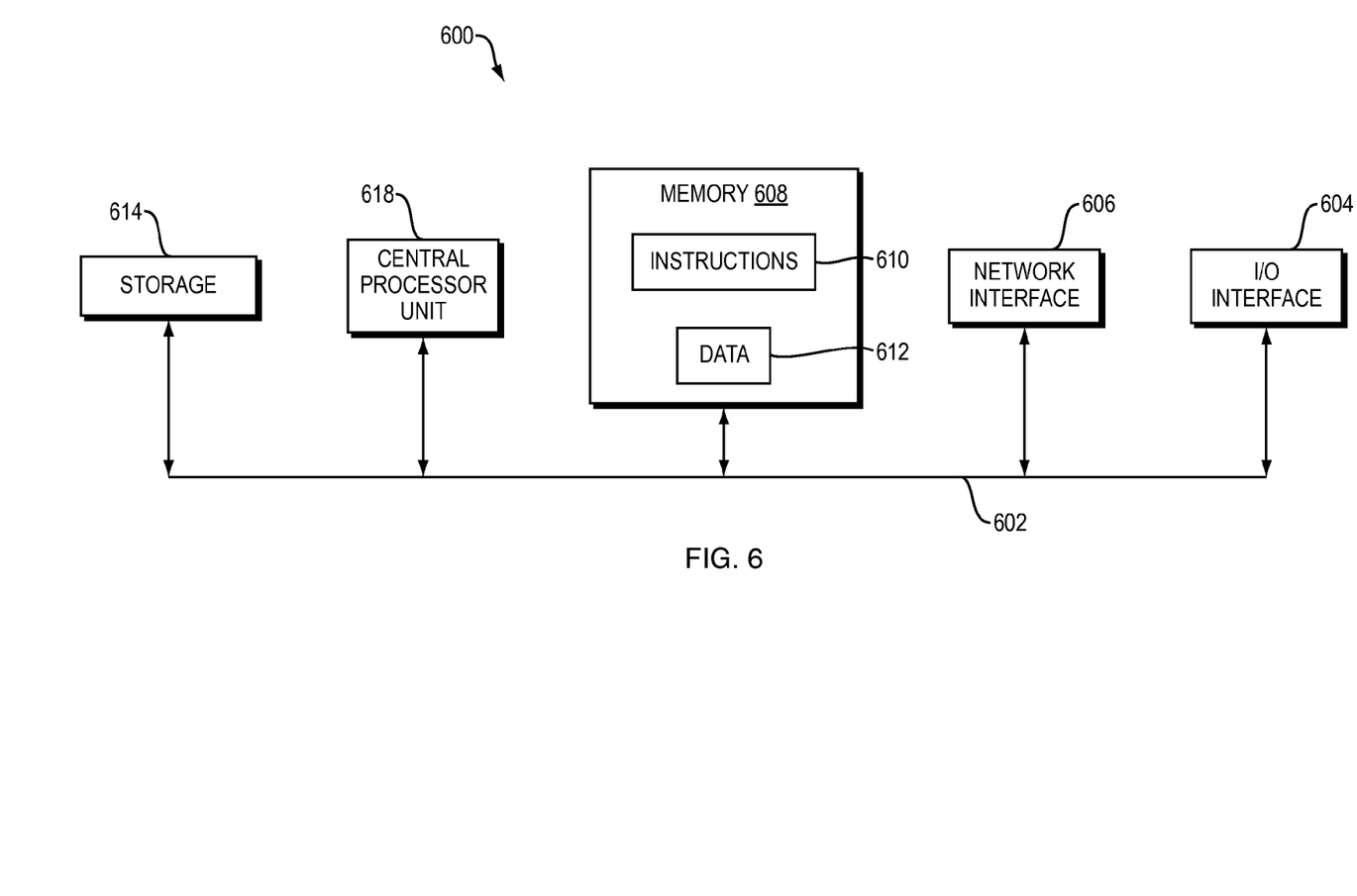
FIG. 6 is a block diagram of an example of an embodiment of an internal structure of a computer in which various embodiments disclosed herein may be implemented.

FIG. 6 is a block diagram of an example of an embodiment of an internal structure of a computer 600 in which various embodiments disclosed herein may be implemented. The computer 600 contains system bus 602, where a bus is a set of hardware lines used for data transfer among the components of a computer or processing system. Bus 602 is essentially a shared conduit that connects different elements of a computer system (e.g., processor, disk storage, memory, input/output ports, network ports, etc.) that enables the transfer of information between the elements. Coupled to system bus 602 is I/O device interface 604 for connecting various input and output devices (e.g., keyboard, mouse, displays, printers, speakers, etc.) to the computer 600. Network interface 606 allows the computer 600 to connect to various other devices attached to a network. Memory 608 provides volatile storage for computer software instructions 610 and data 612 may be used to implement embodiments disclosed herein. Disk storage 614 provides non-volatile storage for computer software instructions 610 and data 612 that may be used to implement embodiments disclosed herein. Central processor unit 618 is also coupled to system bus 602 and provides for the execution of computer instructions.

The teachings of all patents, published applications and references cited herein are incorporated by reference in their entirety.

Further example embodiments of the present invention may be configured using a computer program product; for example, controls may be programmed in software for implementing example embodiments of the present invention. Further example embodiments of the present invention may include a non-transitory computer readable medium containing instructions that may be loaded and executed by a processor, and, when executed, cause the processor to complete methods described herein. It should be understood that elements of the block and flow diagrams described herein may be implemented in software, hardware, firmware, or other similar implementation determined in the future. In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random access memory (RAM), read only memory (ROM), compact disk read only memory (CD-ROM), and so forth. In operation, a general purpose or application specific processor loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments of the invention.

While this invention has been particularly shown and described with references to example embodiments thereof, it will be understood by those skilled in the art that various changes in form and details may be made therein without departing from the scope of the invention encompassed by the appended claims.

What is claimed is:

1. A method for improving computation time of speech recognition processing in an electronic device, the method comprising:

by a processor:
producing at least one first high dimensional feature vector by transforming at least one input feature vector produced from at least one speech signal into a high dimensional space;
producing at least one second high dimensional feature vector by multiplying the at least one first high dimensional feature vector with a matrix, the multiplying including (i) obtaining a table value, from a plurality of table values each corresponding to a unique summation of vector element values of a unique combination of vector elements of a first vector, via an index corresponding to an encoded form of a combination of quantized element values of a second vector, the first vector based on the at least one first high dimensional feature vector and the second vector based on the matrix, and (ii) computing a dot product value of the first and second vectors using the table value obtained, the vector element values, and the quantized element values, wherein the computing causes the processor to use fewer mathematical operations to compute the dot product value relative to a standard dot product computation of the first and second vectors to improve the computation time of the speech processing, the speech recognition processing performing multiple dot product computations to produce the at least one second high dimensional feature vector; and
producing at least one output feature vector based on the at least one second high dimensional feature vector and employing the at least one output feature vector in conjunction with an acoustic model library to produce at least one speech recognition result based on the at least one speech signal.

2. The method of claim 1, wherein the first vector is a feature vector and the vector element values correspond to speech segments extracted from an audio stream for the speech recognition processing, the audio stream received via an audio interface of the electronic device.

3. The method of claim 1, wherein the speech recognition processing employs a feature Maximum Mutual Information (fMMI) method and the quantized element values of the second vector correspond to quantized coefficients of the matrix, the matrix computed by the fMMI method.

4. The method of claim 1, further comprising pre-computing the table.

5. The method of claim 4, wherein the speech recognition processing uses the pre-computed table multiple times for a subset of the multiple dot product computations performed.

6. The method of claim 4, wherein the quantized element values of the second vector correspond to consecutive matrix elements of a given row of a plurality of rows of a given block matrix of an fMMI matrix, and wherein the method of claim 1 further comprises reusing the pre-computed table multiple times, once for each row of the given block matrix.

7. The method of claim 1, wherein the table value is a first table value, the table value obtained is a first table value obtained, the index is a first index, and computing the dot product value of the first and second vectors using the table value obtained, the vector element values, and the quantized element values includes:
obtaining a second table value from the plurality of table values via a second index, the second table value corresponding to a sum value of each vector element value of the vector element values, the second index being a pre-determined index;
computing a first variable value by multiplying a first quantized element value of the quantized element values with the second table value obtained; and
computing a second variable value by subtracting the first quantized element value from a second quantized element value of the quantized element values.

8. The method of claim 7, wherein the encoded form is a binary encoding of the quantized element values of the second vector, each 1-bit value in the binary encoding corresponding to a respective quantized element value of the quantized element values, and further wherein the computing further includes:
computing the dot product value by adding the first variable value to a product of the second variable value and the first table value obtained.

9. The method of claim 7, wherein the encoded form is a binary encoding of the quantized element values of the second vector, each 2-bit value in the binary encoding corresponding to a respective quantized element value of the quantized element values, the first index corresponds to lower order bits from the binary encoding, and further wherein the computing further includes:
computing a third variable value by subtracting the first quantized element value from a third quantized element value of the quantized element values;
computing a fourth variable value by adding the first quantized element value to a fourth quantized element value of the quantized element values, subtracting the second quantized element value from the fourth quantized element value, and subtracting the third quantized element value from the fourth quantized element value;
obtaining a third table value via a third index;
obtaining a fourth table value via a fourth index; and
computing the dot product value by summing:
the first variable value;
a first product value computed by multiplying the second variable value and the first table value obtained;
a second product value computed by multiplying the third variable value and the third table value obtained; and
a third product value computed by multiplying the fourth variable value and the fourth table value obtained.

10. The method of claim 9, wherein the third index corresponds to higher order bits from the binary encoding and the fourth index corresponds to a result of a bitwise and operation between the higher order bits and the lower order bits and further wherein the computing of the fourth variable, the obtaining of the fourth table value, the summing and the computing of the third product value are each omitted, in an event a total number of quantized element values is three instead of four.

11. An apparatus configured to perform speech recognition processing, the apparatus comprising:
a processor configured to:
produce at least one first high dimensional feature vector by transforming at least one input feature vector produced from at least one speech signal into a high dimensional space;
produce at least one second high dimensional feature vector by multiplying the at least one first high dimensional feature vector with a matrix, the multiplying including (i) obtaining a table value, from a plurality of table values each corresponding to a unique summation of vector element values of a unique combination of vector elements of a first vector, via an index corresponding to an encoded form of a combination of quantized element values of a second vector, the first vector based on the at least one first high dimensional feature vector and the second vector based on the matrix and (ii) computing a dot product value of the first and second vectors using the table value obtained, the vector element values, and the quantized element values, wherein the computing causes the processor to use fewer mathematical operations to compute the dot product value relative to a standard dot product computation of the first and second vectors to improve a computation time of the speech processing, the speech recognition processing performing multiple dot product computations to produce the at least one second high dimensional feature vector; and
produce at least one output feature vector based on the at least one second high dimensional feature vector and employ the at least one output feature vector in conjunction with an acoustic model library to produce at least one speech recognition result based on the at least one speech signal.

12. The apparatus of claim 11, further comprising an audio interface and wherein the first vector is a feature vector and the vector element values correspond to speech segments extracted from an audio stream for the speech recognition processing, the audio stream received via the audio interface.

13. The apparatus of claim 11, wherein the processor is further configured to implement a feature Maximum Mutual Information (fMMI) unit, and the quantized element values of the second vector correspond to quantized coefficients of the matrix, the matrix computed by the fMMI unit.

14. The apparatus of claim 11, wherein the processor is further configured to implement a pre-computation unit to pre-compute a table including the plurality of table values and use the pre-computed table multiple times for a subset of the multiple dot product computations performed.

15. The apparatus of claim 14, wherein the quantized element values of the second vector correspond to consecutive matrix elements of a given row of a plurality of rows of a given block matrix of an fMMI matrix, and wherein the processor is further configured to reuse the pre-computed table multiple times, once for each row of the given block matrix.

16. The apparatus of claim 11, wherein the table value is a first table value, the table value obtained is a first table value obtained, the index is a first index, and wherein the computation unit is further configured to:
  obtain a second table value from the plurality of table values via a second index, the second table value corresponding to a sum value of each vector element value of the vector element values, the second index being a pre-determined index;
  compute a first variable value by multiplying a first quantized element value of the quantized element values with the second table value obtained; and
  compute a second variable value by subtracting the first quantized element value from a second quantized element value of the quantized element values.

17. The apparatus of claim 16, wherein the encoded form is a binary encoding of the quantized element values of the second vector, each 1-bit value in the binary encoding corresponding to a respective quantized element value of the quantized element values, and further wherein the computation unit is further configured to:
  compute the dot product value by adding the first variable value to a product of the second variable value and the first table value obtained.

18. The apparatus of claim 16, wherein the encoded form is a binary encoding of the quantized element values of the second vector, each 2-bit value in the binary encoding corresponding to a respective quantized element value of the quantized element values, the first index corresponds to lower order bits from the binary encoding, and further wherein the computation unit is further configured to:
  compute a third variable value by subtracting the first quantized element value from a third quantized element value of the quantized element values;
  compute a fourth variable value by adding the first quantized element value to a fourth quantized element value of the quantized element values, subtracting the second quantized element value from the fourth quantized element value, and subtracting the third quantized element value from the fourth quantized element value;
  obtain a third table value via a third index;
  obtain a fourth table value via a fourth index; and
  compute the dot product value by summing:
    the first variable value;
    a first product value computed by multiplying the second variable value and the first table value obtained;
    a second product value computed by multiplying the third variable value and the third table value obtained; and
    a third product value computed by multiplying the fourth variable value and the fourth table value obtained.

19. The apparatus of claim 18, wherein the third index corresponds to higher order bits from the binary encoding and the fourth index corresponds to a result of a bitwise and operation between the higher order bits and the lower order bits and further wherein the computing of the fourth variable, the obtaining of the fourth table value, and the summing and the computing of the third product value are each omitted, in an event a total number of quantized element values is three instead of four.

20. A non-transitory computer-readable medium for improving computation time of speech recognition processing in an electronic device, the non-transitory computer-readable medium having encoded thereon a sequence of instructions which, when executed by a processor, causes the processor to:
  produce at least one first high dimensional feature vector by transforming at least one input feature vector produced from at least one speech signal into a high dimensional space;
  produce at least one second high dimensional feature vector by multiplying the at least one first high dimensional feature vector with a matrix, the multiplying including (i) obtaining a table value, from a plurality of table values each corresponding to a unique summation of vector element values of a unique combination of vector elements of a first vector, via an index corresponding to an encoded form of a combination of quantized element values of a second vector, the first vector based on the at least one first high dimensional feature vector and the second vector based on the matrix, and (ii) computing a dot product value of the first and second vectors using the table value obtained, the vector element values, and the quantized element values, wherein the computing causes the processor to use fewer mathematical operations to compute the dot product value relative to a standard dot product computation of the first and second vector to improve the computation time of the speech processing, the processor performing multiple dot product computations to produce the at least one second high dimensional feature vector; and
  produce at least one output feature vector based on the at least one second high dimensional feature vector and employ the at least one output feature vector in conjunction with an acoustic model library to produce at least one speech recognition result based on the at least one speech signal.

* * * * *